US006740875B1

(12) United States Patent
Ishikawa et al.

(10) Patent No.: US 6,740,875 B1
(45) Date of Patent: May 25, 2004

(54) GAMMA WATERMARKING

(75) Inventors: Muriel Y. Ishikawa, Livermore, CA (US); Lowell L. Wood, Simi Valley, CA (US); Ronald W. Lougheed, Livermore, CA (US); Kenton J. Moody, Livermore, CA (US); Tzu-Fang Wang, Danville, CA (US)

(73) Assignee: The Regents of the University of California, Oakland, CA (US)

( * ) Notice: Subject to any disclaimer, the term of this patent is extended or adjusted under 35 U.S.C. 154(b) by 0 days.

(21) Appl. No.: 09/502,859

(22) Filed: Feb. 11, 2000

Related U.S. Application Data

(60) Provisional application No. 60/119,755, filed on Feb. 11, 1999.

(51) Int. Cl.[7] .......................... G01T 1/161; H01J 1/52; G09K 3/00; G21H 5/02

(52) U.S. Cl. .................. 250/302; 250/303; 250/363.01; 250/363.04; 250/370.09; 250/370.1

(58) Field of Search ................................ 250/302, 303, 250/363.01, 363.04, 370.09, 370.1

(56) References Cited

U.S. PATENT DOCUMENTS

| | | | | |
|---|---|---|---|---|
| 4,338,520 A | * | 7/1982 | Stewart | 250/356 |
| 4,363,965 A | * | 12/1982 | Soberman et al. | 250/302 |
| 4,571,492 A | * | 2/1986 | Kane et al. | 250/303 |
| 4,736,107 A | * | 4/1988 | Myron | 250/492.2 |
| 4,833,327 A | * | 5/1989 | Hart | 250/363.01 |
| 5,177,360 A | * | 1/1993 | Fernandez-Rubio | 250/303 |
| 5,361,249 A | * | 11/1994 | Monastra et al. | 370/16 |
| 5,528,495 A | * | 6/1996 | Roscoe | 702/8 |
| 5,825,033 A | * | 10/1998 | Barrett et al. | 250/370.1 |
| 5,841,141 A | * | 11/1998 | Gullberg et al. | 250/363.04 |
| 6,225,625 B1 | * | 5/2001 | Pirrung et al. | 250/302 |
| 6,236,050 B1 | * | 5/2001 | Tumer | 250/370.09 |
| 6,329,143 B1 | * | 12/2001 | Stryer et al. | 435/6 |
| 6,392,235 B1 | * | 5/2002 | Barrett et al. | 250/363.06 |

OTHER PUBLICATIONS

Bostick et al., "Evaluation of Improved Techniques for Removing Strontium and Cesium from Process WasteWater and Groundwater", Oak Ridge National Laboratory Nov. 12, 1999, http://www.ornl.gov/divisions/ctd/ESP/96tasks/eval.htm.*

Westinghouse Savannah River Company, OSR 3–4a–W(REV 1–89), Apr. 28, 1998, Zeolite Ion Exchange.*

Moyer et al., "Solvent Extraction of Radionuclides from Aqueous Tank Waste", Oak Ridge National Laboratory Jan. 28–30,1997, http://www.ornl.gov/divisions/casd/csg/tank-waste.html.*

* cited by examiner

*Primary Examiner*—John Lee
*Assistant Examiner*—Bernard Souw
(74) *Attorney, Agent, or Firm*—John P. Wooldridge; Alan H. Thompson

(57) ABSTRACT

A covert, gamma-ray "signature" is used as a "watermark" for property identification. This new watermarking technology is based on a unique steganographic or "hidden writing" digital signature, implemented in tiny quantities of gamma-ray-emitting radioisotopic material combinations, generally covertly emplaced on or within an object. This digital signature may be readily recovered at distant future times, by placing a sensitive, high energy-resolution gamma-ray detecting instrument reasonably precisely over the location of the watermark, which location may be known only to the object's owner; however, the signature is concealed from all ordinary detection means because its exceedingly low level of activity is obscured by the natural radiation background (including the gamma radiation naturally emanating from the object itself, from cosmic radiation and material surroundings, from human bodies, etc.). The "watermark" is used in object-tagging for establishing object identity, history or ownership. It thus may serve as an aid to law enforcement officials in identifying stolen property and prosecuting theft thereof. Highly effective, potentially very low cost identification-on demand of items of most all types is thus made possible.

58 Claims, 1 Drawing Sheet

GAMMA WATERMARKING

REFERENCE TO PROVISIONAL APPLICATION TO CLAIM PRIORITY

A priority date for the present U.S. patent application has been established by prior U.S. Provisional Patent Application, Ser. No. 60/119,755, entitled "Gamma Watermarking" filed on Feb. 11, 1999.

The United States Government has rights in this invention pursuant to Contract No. W-7405-ENG-48 between the United States Department of Energy and the University of California for the operation of Lawrence Livermore National Laboratory.

BACKGROUND OF THE INVENTION

1. Field of the Invention

The present invention relates to the creation and use of generalizations of classical watermarks for object identification, and more specifically, it relates to a relatively covert, "watermark" expressed in gamma-ray-emitting materials affixed to objects and employed for object identification. The "gamma watermark" of the present invention is a type of steganography, or "hidden writing," which employs tiny quantities of material containing radionuclides to encode and continuously express a digital bit-string which may, for instance, be used to connote ownership of, or some type of prior contact with, an object whose provenance is in some manner contested or doubted.

2. Description of Related Art

A need exists for greatly improved means for general-purpose object identification. For example, a need exists for apprehending those responsible for theft of rare human artifacts and paleontological specimens, as a rapidly growing to problem is posed by escalating fossil and artifact thefts worldwide. A need exists for a broadly applicable means of labeling all such objects with a physically essentially-invisible, zero-hazard and relatively inexpensive 'tag' which could be discerned and then 'read' unequivocally only by well-equipped and expert individuals (e.g., law enforcement officials). Familiar tagging means is such as bar-codes, while eminently readable, also are readily detectable and often may be easily removed or altered. Digital watermarking of collections-of-bits encoding audio or graphics information is applicable only to bit-strings whose low-order bits may be manipulated for encoding purposes without damage to the perceived content of the collection-of-bits, a quite scope-limited though increasingly important type of property.

SUMMARY OF THE INVENTION

It is an object of the present invention to provide a gamma watermark containing a unique digital signature comparable in salient qualities to that of the digital watermark, but which may be applied to identify essentially, all items implemented as greater than microscopic-sized material objects.

It is another object, albeit an optional one, to provide, within a gamma watermark, a built-in 'clock' providing a date-stamp representation of the time of gamma watermark creation relative to the time at which the gamma watermark is being read, i.e., an age of the watermark.

Another object of the invention is to provide a gamma watermark that is undetectable by ordinary technical-inspection means (e.g., use of UV-fluorescence-stimulating illumination, magnified visual inspection, acoustic scanning, chemical treatment of an object's surface, x-ray inspection, etc.), Still another object of the invention is to provide a gamma watermark having an ultra-low radiation 'signature' hidden in the ubiquitous natural background radiation due to cosmic radiation and natural plus man-made radioactivity in the environment (e.g., that due to decay of potassium 40, a billion-year half-lived isotopic component of natural potassium).

An object of the invention is provide a gamma watermark having an effectively microscopic physical size in order to enable second-level covertness-of-tagging and to confer sweep-resistance and counterfeit-robustness by owner-determined selective positioning on or within an object.

The gamma watermark is a new type of very low-level (i.e., nanoCurie-scale) gamma-ray-emitting tag or "watermark", comprised of a sufficiently precisely metered, typically unique mixture-ratio of very small (of the order of 1 nanoCurie, or $10^{-9}$ Curie) quantities of radioisotopes of appropriately long half-lives, none of which occur naturally (at levels as high as 1 nanoCurie) in the object to be tagged. The tag's location may be variable, ranging from surface emplacement to cm-scale depth inside a full-density object (composed, e.g., of plastic, wood, stone, etc.) because MeV-energy gamma-rays are quite penetrating. In creating the tag, the ratios of the quantities of radioisotopes selected to comprise any given tag are made to be sufficiently precise to encode a binary bit-string with adequate "noise margin" for unequivocal read-out at all subsequent times-of-interest and, if required by the particular tagging application, to be sufficiently unique among the tags applied to the class of objects that will ever be identified with such watermarks. Selected radionuclides package a huge amount of energy per gram and release it at a known rate for decades, so that gamma watermarks may be created which are fully useful over multi-decade intervals.

Radionuclides chosen for constituting a gamma watermark are either not present in the environment or are present at very low levels, so that a gamma watermark signatures may be very 'clean' in the signal-to-noise sense. It is also possible to use radionuclides which are quite difficult to prepare, for example one which have unique production signatures betraying their means of generation. A number of radionuclides (e.g., $^{44}Ti$) of interest from these perspectives may be produced only, by spallation or charged-particle bombardments. Others have unique isotopic purity by virtue of using mass-separated target material or mass-separation after production. Use of such nuclides in gamma watermarks can drastically raise the threshold of endeavor for a would-be watermark counterfeiter, due to their uniqueness or the difficulty of obtaining them.

The nature of the gamma watermark is particularly convenient in many applications because gamma rays are peculiarly penetrating electromagnetic radiations. Many normal structural materials (e.g., wood, common plastics) have density $\rho \sim 1$ gm/cc, while fossilized bone can have $\rho=2$–3 gm/cc and paper typically has $\rho=1$ gm/cc. Since the mass absorption coefficient of light elements such as carbon, nitrogen, oxygen, magnesium, aluminum and silicon for photons of 1 MeV energy, hereinafter referred to as 1 MeV γs, is $\leqq 0.04$ cm$^2$/g, the transport mean free path for such MeV-energy gamma-rays in all such materials is 25 g/cm$^2$, e.g., 25. cm in 1 gm/cc material. Therefore, a gamma watermark could be implanted at a one-inch depth in low-to-moderate Z material and 90% of the emitted gamma-rays would still travel without scattering or absorption to a detector positioned over the material's surface.

Similarly, a gamma watermark can be easily detected through modest stack-heights (a few cm) of paper. In fact, the activity level of the gamma watermark on any given paper-sheet could be made exceedingly small (picoCurie level), if working with stacks of paper all of which were so watermarked in a (nearly) identical manner; a detector used to examine a sheaf of such individually watermarked paper-sheets would "see" all the separate-but-identical watermarks superimposed into one which could be readily read out.

The salient components of standard physical theory underlying the gamma watermark include nuclear beta-decay and gamma-ray spectroscopy, semiconductor-based detection of ionizing radiation and viscous fluid-mechanical theory underlying ink-jet printers leveraged to enable high precision, swift creation of tokens in the direct gamma-watermarking of sheets of material such as plastic and paper. The gamma watermark (typically, redundantly) encodes its age (i.e., the time-elapsed since its creation) and a unique digital signature in the sufficiently-precisely-metered relative quantities of several different species of long lived, gamma ray-emitting radioisotopes. Because the photonic output of the beta-decay of a single atomic nucleus may be recorded with high efficiency and high precision, the amount of beta radioactivity needed to continuously express a unique digital signature may be made to be exceedingly small, at most 1 nanoCurie in many applications.

From a communications engineering perspective, the gamma watermark utilizes very low effective radiated power and very high spectral brightness at certain very narrowly defined energies/frequencies to "narrow-cast" a low-probability-of-intercept signal, using a long-lived, high-reliability nuclear power supply.

In the watermark's built-in clock, at least two radioisotopes are employed to encode the date of creation of the tag at which time the ratio of the intensities of trio gamma-ray-emitting transitions of the trio radioisotopes of different half-lives is made to be equal (to a sufficiently precisely extent for subsequent read-out purposes) in the watermark-tag. At any later time, the then-observed ratio of the line-intensities, which may be determined as precisely as desired by increasing the counting interval, from these two (or more) transitions of known half-life constitutes a 'clock' from which 'elapsed time' can be traced back. Two or more such clocks can be so encoded (e.g., by employing radioisotopes of widely differing half-lives) by the use of three or more radioisotopes.

The content of the Watermark's digital signature (a sequence of bits in a binary bit-string potentially dozens of bits in maximum length) is encoded in a manner basically similar to the clock(s). The ratio of the time-zeroed line intensity of the gamma radiation from a radioisotope to any reference line intensity encodes in an analog format of the magnitude of a string of binary digits, i.e., the binary fraction-expressed line-intensity ratio. Each radioisotope comprising a Watermark contributes a short string of bits (in most applications, 1–5 bits) to the total digital bit-string content of the Watermark. For purposes of reading-out this bit-string, the ratio of the line intensity of the gamma radiation from a radioisotope to a reference line intensity (e.g., that of the highest-energy line emitted by the longest-lived radioisotope used in the gamma watermark's clock) is translated back to the time-of-creation of the Watermark using the time-interval encoded in the particular watermark's clock.

The amount of information coded per radioisotope/radionuclide is user-selectable and depends on the amount of radioisotope used and its half-life relative to the specified effective lifetime of the watermark, the time interval available for readout of the Watermark's contents, and the desired robustness of the readout (e.g., the degree of error syndrome-encoding, and thus redundancy, in the digital signature).

If faster readout or reduced total activity is desired for a Watermark containing any specified number of binary bits, then the total desired activity may be partitioned among more radioisotopes, each with a smaller amount of activity. This means that doubling the number of radioisotopes and cutting the total activity per radioisotope by 4-fold (e.g., the gamma watermark total activity drops by 2-fold) results in a required total Watermark readout time that is decreased by a factor of 4 (e.g., the first Watermark encodes 4 bits per radioisotope, while the second encodes only 2 bits on each of twice the number of radioisotopes, etc.)

To enhance the integrity of the gamma watermark, its digital signature may be error-syndrome, e.g., Hamming, -coded, e.g., in order to permit automated detection of 2-bit errors and detection-and-correction of single bit errors anywhere within its bit string. This feature makes feasible the objective expert certification of the digital content and integrity of the Watermark and also permits automated, minimum-elapsed time readout of the digital content of the Watermark.

If a binary bit-string of information is to be encoded N bits per radioisotope, i.e., as a binary-fraction specifying the intensity of a given spectral line emitted by a single radioisotope comprising a portion of the radiological inventory of a gamma watermark, then $\sim(3\times 2^N)^2$ gamma-ray counts of that spectral line need to recorded, in order to have a statistically reliable estimate of the relative intensity which is statistically reliable at the level of three standard deviation about the true mean value. To get N binary bits of line-intensity information, the line-strength must be read out to 1 part in $2^N$. (I.e., five (5) bits require 1 part in 32, while four (4) bits require 1 part in 16, three (3) bits require 1 part in 8, two (2) bits require 1 part in 4, and one (1) bit requires 1 part in 2.) Thus, to generate a spectral peak amplitude of the required precision when reading-out a five-bit code, $3\times(2^5=32)^2$ or 3072 counts are needed at that spectral-line energy, while for 2 bits, only $3\times 4^2=48$ counts are needed to read out the spectral peak strength to the required precision. Of course, signals from many radioisotopes may be read out concurrently during the same 'time interval' with a standard high-resolution gamma-ray spectrometer, as they each have at least one distinct-and-unique gamma-ray spectral energy.

A typical, in-the-field exemplary method for mass-producing gamma watermarks uses inkjet printers of the type often used with personal computers, representative unit costs of which at retail currently are ≦$500. Various (e.g., 7) ink reservoirs in the ink cartridges of a single "photographic quality" color printer are loaded with radioisotopes in solution wherein one (1) radioisotope at precisely known concentration is loaded per reservoir. Computer software (e.g., the manufacturer's inkjet printer-driver) may be used to write the "digital signature" constituting the Watermark by issuing appropriate low-level commands to the printer. For example, 29 drops of "ink" are dispatched from reservoir number 1, 17 drops from reservoir number 2, 4 drops from reservoir number 3, 21 drops from reservoir number 4 and 15 drops from reservoir number 5. This would serve to encode a bit string of 1110110001001001010101101, because the series of 5 binary bit strings equals 29, 17, 4, 21 and 15, i.e., 11101=29, 10001=17, 00100=4, 10101=21 and 01101=15. The Watermark's clock is introduced by adding, e.g., 64 drops each from reservoirs #6 and #7. The above steps might be repeated until, for instance, 1,000 spatially separated watermarks have been so written, with each watermark thus having a distinct (typically, unique) computer program-controlled digital content. Potentially, all 1000 Watermarks could be placed on a single sheet of paper, e.g., each associated with a readily legible label. Mass-market inkjet printers currently write at 600 dots per inch, so a single Watermark would cover less than $10^{-5}$ inches$^2$, if the ink-dots of each Watermark were written on top of each other. The Watermarks so synthesized (and, if desired, labeled) could then be partitioned and packaged.

Among the objects which are amenable to inkjet application are stick-on labels and/or objects that are designed to be Gamma Watermarked (such as CD-ROMs). The position of the tag may be visually invisible or may be included as part of the specific text or symbols (e.g., a logo) by either under or overprinting or even including the radionuclides of the gamma-emitting tag in the visible ink itself. The inkjet printer version of the Gamma Watermark technology can also be used to directly 'tag' objects, e.g., the inkjet tagging capability may be used directly on objects to be watermarked, without resorting to prior printing of these tags on paper and later (e.g., paste-on) emplacement on the objects.

DETAILED DESCRIPTION OF THE INVENTION

Figure 1:
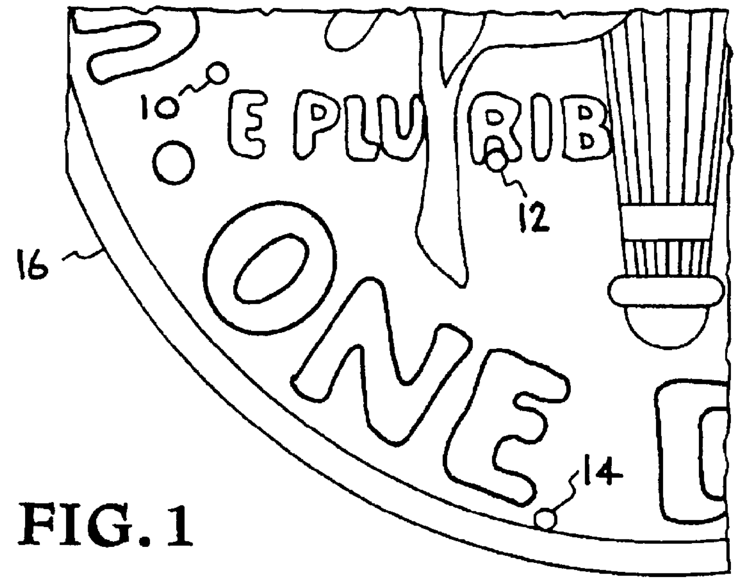
FIG. 1 shows the placement of three watermarks on the surface of a dime.

A very low-level (i.e., nanoCurie) gamma ray-emitting tag or "watermark," comprised of a unique combination of appropriately long half-life radioisotopes, none of which occur (at nanoCurie levels) naturally in the object to be tagged, is placed upon an object (or even up to a few cm inside a full-density object) which it is desired to subsequently identify. The placement of the watermark is robust and of as low overall visibility as is reasonably attainable (e.g., at the bottom of 0.01 cm-diameter drilled hole in an object such as a fossil bone, which hole is then backfilled carefully and/or covered-over so as to leave essentially no surface scar). FIG. 1 shows the placement of several tags 10, 12 and 14 on the surface of a dime 16. This placement is suitably, documented, including the composition of the tag (e.g., via the number or number-equivalent data which it encodes, which may be keyed to a serial number on the tag's package) and the date and the precise location of placement (e.g., by an image of the tagged location). The ratios of amounts of radioisotopes selected for any given tag may be (and typically is) made to be unique, at least among the class of objects which will ever be tagged with this means. This constitutes the object-tagging operation.

Several techniques are feasible for creating very small or even microscopic-scale tags. A non-exclusive, in-the-field example involves a technique that utilizes inexpensive laboratory materials, is highly adaptable, and supports easy emplacement in the field. The radionuclides comprising the watermark are absorbed onto commercially available spherical cation-type ion-exchange beads from solution. Ion-exchange resin beads (preferably, pre-sized) are simply mixed with the radionuclide, dissolved in either water or dilute mineral acid, the liquid removed, and the beads dried. (If the beads are not pre-sized, there will simply be a wider variation in the radionuclide loading per bead.) If desired, even thousands of such radioactive beads may be produced at one time, in a small test tube. The dried beads are then individually packaged and assayed to determine their radioactive content. The beads sizes can readily range from nearly invisible (<50 micrometers diameter), to much larger sizes (>1000 micrometer diameter). If emplacement conditions where attaining the smallest possible tag size are not important, the larger size beads could be used. A simple head-mounted magnifier-viewer, a hand-held light and fine-tipped forceps or other tools are adequate to handle such beads in the laboratory or the field.

Although single beads with multiple radionuclides are included in the scope of the present invention, for many applications it may be more convenient to have only one radionuclide per bead. This permits the tag composition decision to be made at the time the tag is emplaced. For example, two or more beads containing distinct individual radionuclides could be placed in the same position. If a different ratio of activities is desired, more than one bead of the same radionuclide could be used. The beads may be emplaced in or adhesive added to fix their position and to protect them. (The ideal depth of emplacement is two or more mm, so that overlying material may absorb beta particles typically associated with gamma-ray emission which might otherwise betray rather precisely the location of the tag's position. Although thin window counters capable of detecting low energy beta particles are not common, it is possible that a very knowledgeable person with enough time might detect a more radioactive beta-emitting tag placed very close to the surface of the object being tagged.)

For field application, the beads loaded with radionuclides and comprising the gamma watermark tag may be placed in a crevice or pit for irregular objects, in a hole drilled with a battery-operated tool (e.g., a powered hand-tool with a fine bit or, for more difficult and fragile objects, a portable dentist's drill). If broken pieces of an object are repaired in the field, the beads can be placed in the interfaces prior to their being secured together. In all circumstances, the ion-exchange beads should remain dry (as water will tend to leach the radioactivity from them), so they need to be encased in adhesive or some other protective coating after emplacement. Ideally, a (typically, digital) photo with fiducial marks should document the tag location(s).

When it is desired to subsequently identify an object believed to have been gamma-watermarked, a suitable high-sensitivity and high-energy-resolution detector of gamma radiation is placed over the location in which the tag had been documented to have been placed. In spite of the extremely weak (albeit highly penetrating) gamma emission by the tag, such a detector will generate a signal sufficient to tell in 10–100 seconds if the tag exists in the examined location (e.g., by looking for a 'signature' ratio of gamma-ray line-emission on the part of two selected 'keying' radioisotopes), and usually will be able to 'read' the unique gamma watermark with adequate accuracy in less than 1000 seconds. This gamma-ray line-emission 'signature' may be made to be unique to the tag at all future times after it is emplaced, and may be made to encode the dates of tag generation and emplacement. Gamma-ray emission at the examined location on the tagged object, which location and signature could be declared/asserted by the putative tag-placer prior to the examination, and its unique bit-string-encoding "signature" would suffice to establish the existence of the gamma watermark on the object, just as DNA 'signatures' and 'digital watermarks' are admitted currently as prima facie evidence.

Gamma-ray watermarks also may be used to create two-dimensional signature logos. Modern strip gamma-ray detectors or Compton gamma-ray imaging detectors can be used to identify the 2D-logo pattern of gamma-ray watermarks, thereby increasing the "uniqueness" of the watermarks to far higher levels. (3D-logo patterns can also be created and identified using gamma-ray tomography. High-energy radioactive ion beams are among the means which may be used to create such watermarks, the combination of the beam energy/direction versus the stopping power of the medium providing unique 3-D signatures.)

The special features of the preferred gamma watermark tag include its near-microscopic physical size and its very low-level radiation (which incidentally eliminates all possible radiological hazards, as even swallowing the tag would entail far less radiation-dosing than occurs from the body's natural radioactivity), which practically preclude its being 'swept' from the tagged object by instrument-supported inspection, even if ordinary gamma-ray detectors (e.g., scintillation and proportional counters) are employed. (Even inspection with special gamma-ray instrumentation will be unavailing, unless the tag's location on the tagged object is reasonably well-known—to a few cm positional accuracy—no matter how diligently either class of instrumentation might be employed. Geometric signal-attenuation and natural background gamma-radiation combine to provide a highly effective mask for the exceedingly weak emissions of the tag, and ordinary gamma-ray detectors lack the extraordinary gamma-ray energy-resolution necessary to detect and resolve the tag's line-emissions against the gamma-radiation emitted by background sources.) Indeed, the tag may be detected and read only with use of modern gamma-ray energy spectrometers (e.g., employing large, cooled, high-purity germanium crystals) with their sensor-crystals applied reasonably precisely over the tag's location for substantial intervals; however, the tag's existence may be unequivocally detected with such instrumentation on a minute time-scale (thereby supporting low-latency, high-certitude assertion of tag existence).

As one alternate to the color inkjet printer and microscopic embedded object means of tag synthesis noted above, very large number of tags may be activated simultaneously via exposure to either a neutron or charged particle beam flux, after suitably chosen and documented mixes of materials have been co-located into each of a large collection of figurative microdots of taggant materials. For instance, one each of a set of chemical compounds of isotopes chosen to implement tags may be mixed with each of the several different inks employed in a modern digital ink-jet printer (one stable isotope per ink-color), and variable 'colors' (and thus variable mixes of isotopic compositions) automatically printed under algorithmic software control onto a suitable medium (which may be a sheet of special plastic or paper), in a manner similar to those described above for metering radionuclide-bearing solutions onto tag-media. This entire batch of tags might then be activated in a neutron and/or charged-particle beam flux, and then separated into individual tags in (~0.01 cm-scale) formats suitable for emplacement in the particular application, along with corresponding documentation for each tag (as to composition, date and degree of activation, etc.). When fully established as a tagging technology, the cost to create a gamma watermark tag thus may be so low that the total cost of object-tagging would be dominated by the "touch labor" cost of emplacing the tag on or within the object and documenting its placement and digital content, so that this tagging technology could be employed even in quite low economic margin applications.

As noted above, the gamma watermark redundantly encodes its age since creation and a unique digital signature in the precisely determined relative quantities of several different species of long-lived, gamma-emitting radioisotopes which are combined together into the physical token or tag constituting the watermark. Since the photonic output of a single nuclear beta decay may be recorded with high efficiency (better than part-per-thousand photon energy resolution) by the best modern detectors, the amount of activity required to continuously express a unique digital signature may be made exceedingly small, of the order of 0.1 nanocurie. Correspondingly, the total mass of the watermark token may be made to be well under 1 microgram, and its typical physical size substantially less than 0.01 cm.

At least two radioisotopes are typically employed to encode the date-of-creation of the tag, at which time the ratio of the intensities of two gamma-ray-emitting transitions of two radioisotopes of different half-lives is made to be equal in the watermark, by convention. At any later time, the then-observed ratio of these line intensities constitutes a 'clock' whose 'elapsed time-reading' may be determined as precisely as desired, simply by choosing how long to inspect the clock, i.e., choosing the number of counts from each radioisotope to record in the semiconductor based gamma-ray detector being used to inspect the watermark. (An alternate clock convention would be to initiate a tag with a fixed, reference amount of a single clock radionuclide in it, and to determine the age of the tag thereafter by the fraction of the reference amount which remained.)

When two or more radionuclides are used in the 'clock', this is known as a "relative" or "ratio" clock. Obviously, clocks of widely differing time-scales may be readily created in the same watermark by use of three or more (two or more, in the case of the alternate clock convention) gamma-emitting radioisotopes of appropriately-chosen half-lives, as noted above.

The content of the Watermark's digital signature, i.e., the sequence of bits in a binary bit-string of dozens of bits total length, is encoded in a manner identical in principle to that of the clock's bits which express the time elapsed since the creation of the watermark. Namely, the ratio of the line-intensity of the gamma-radiation from a radioisotope to a reference line-intensity (e.g., to that of the longest-lived radioisotope constituting the Watermark's clock, or to some absolute amount of radioactivity), translated back to the time of creation of the Watermark by use of the time interval encoded in the clock, encodes a short string of binary bits, generally 1–5 bits in length, for each radionuclide used. (The amount of information coded per radioisotope is rather widely variable, depending on the amount of radioisotope to be used and its half-life relative to the specified effective lifetime of the Watermark, the time-interval available for readout of the Watermark's content, the desired robustness of readout, e.g., the degree of error syndrome-encoding employed in the digital signature, as discussed below, etc.). Several such radioisotopes are employed to (independently) encode as many such 1–5-bit-length 'code blocks' as may be desired to aggregate to the total digital signature of the Watermark. (Again, typically, the ordering of these code blocks to constitute the total digital signature is, from highest order to lowest order bit in the signature, that bit-string decoded from the relative amplitude of lowest-energy gamma-ray spectral line, and then other code blocks sequentially in order of increasing originating gamma-ray spectral energy, all the way up to the code block arising from the highest energy line. Many such conventions are possible, e.g., block ordering based on the atomic number of the radioisotope emitting the line whose intensity encodes the bits in the block-provided that the background counting-rate is much less than that arising from the tag.)

For unusually noisy data, such as that arising from sub-optimal counting time or a high-background counting environment, a special wavelets-based de-noising preprocessing software/hardware may be employed, and special gamma-ray de-convoluting software with peaks-detection sensitivity higher than any of the commercial available software may also be used. Such de-noising techniques, along with redundantly-encoded watermarks, may significantly increase the robustness of the system in more challenging field circumstances.

In order to readout the digital content of any given gamma-line, a total number of gamma-ray counts equal to about three times the square of two raised to the power of its number of encoded bits is recorded by the detector from that spectral line, e.g., if 5 bits are encoded on that line, then 2 to the fifth power is 32, 32 squared is 1024, and so approximately 3048 counts, each with energy corresponding to that spectral line, are required to be recorded in order to generate a spectral peak-amplitude of the precision adequate for subsequent processing. For example, if 0.1 nanocuries of activity for any radioistope is to be used in a tag, about two gamma-ray counts per second will be recorded with an optimized modern detector employed in low-background counting circumstances, so that roughly a half-hour will be required to readout the encoded bit-string represented by this particular radioisotope's gamma-emission. Of course, many such radioisotopes may be 'readout' during the same time-interval with the same detector, as they each have a distinct-and-unique gamma-ray spectral energy (or, in some cases, several distinct gamma-ray energies per decay event). In this particular example, after the half-hour readout interval, the decoded 5-bits from each of the several code blocks are assembled to constitute the total digital signature of the Watermark being readout.

Figure 2:
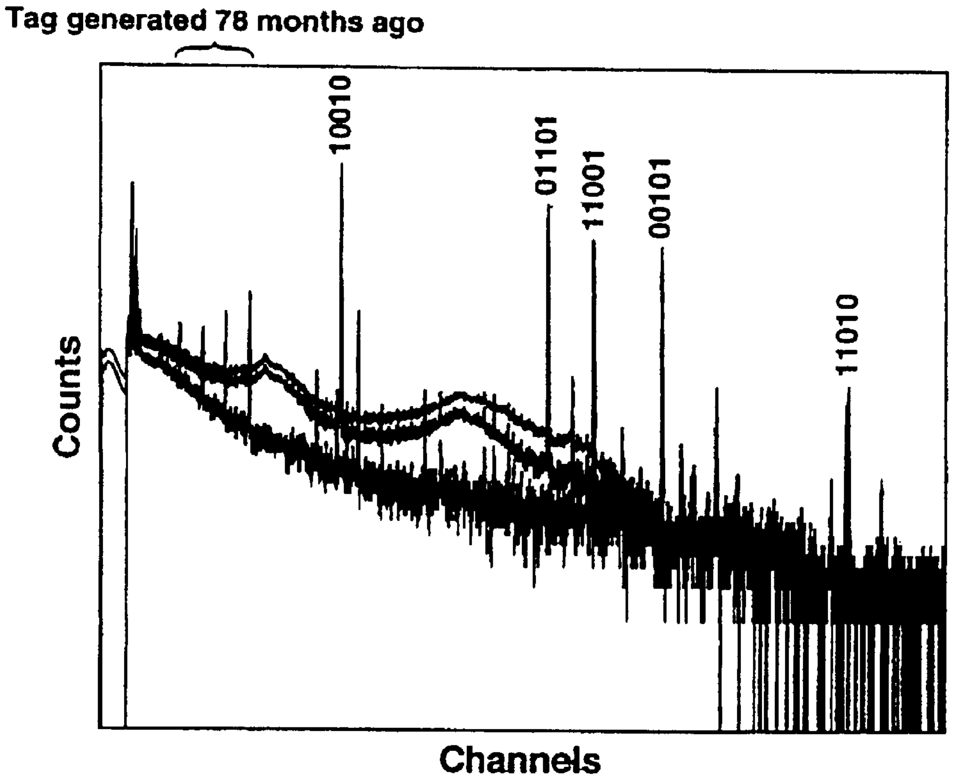
FIG. 2 shows the spectral image of a representative gamma watermark.

If faster readout or reduced total activity is desired for a Watermark of any specified number of binary bits, then the total desired activity is partitioned among more radioisotopes, each one carrying a correspondingly smaller amount of activity. For example, doubling the number of radioisotopes and cutting the total activity per radioisotope by four-fold, so that the Watermark's total activity drops by two-fold, will result in a required Watermark readout time which is decreased by a factor of 4 (when the first Watermark encodes 4 bits per radioisotope and the second one encodes only 2 bits on each of twice as many radioisotopes). FIG. 2 shows the spectral image of a representative gamma watermark.

In order to maximize integrity of the Gamma Watermark, the Watermark's digital signature may be redundantly encoded, e.g., Hamming error-syndrome coded, so that it carries within its total bit-string the additional (redundant) information required to detect any two-bit errors and to detect and correct any single-bit error occurring anywhere in its entire bit-string. This redundancy feature makes more feasible the objective expert certification (e.g., to a court of law) of the digital content and integrity of the Watermark, employing universally recognized methods of statistical inference applied to unquestioned physical law. (As is well-known, the 'premium' on this type of Watermark-integrity 'insurance' has only a logarithmic cost, e.g., 6 bits out of a total digital signature-length of 32 bits, 7 out of 64, etc., are expended in such second-level Hamming error-syndrome encoding, which is the type widely employed in so-called 'ECC-type' digital RAM memory elements currently used in essentially all top-end personal digital computers.) Importantly from a practical standpoint, the existence of such a Hamming error syndrome also permits the computer-automated readout of the Watermark in minimum time, in any given circumstances: the detector-based readout of the Watermark's digital content proceeds under computer supervision, with continually decreasing fractional errors in spectral line intensities, through the moment that the continuously decoded Hamming error syndrome specifies that two bits of the total signature are in error, then (at a subsequent moment, when the ratios of the gamma-ray spectral peak heights are more precisely known) that a single bit of the total signature remains in error, and the gamma counting readout is finally concluded when continuing error-syndrome decoding certifies that no bits in the entire digital signature are presently. in error.

Generally, the Watermark's total level of gamma-ray emission is far less than the Watermarked object continually emits due to its natural radioactivity. (For example, a single adult human body emits thousands of gamma-rays each second, simply due to its inventory of naturally-occurring potassium-40, while a typical Watermark emits of the order of 1–10 gamma-rays each second.) A Watermark thus is detectable only by placing a maximally sensitive detector reasonably precisely (to within a distance which is perhaps one-quarter of the detector's active diameter) over the position of the Watermark on or within the material object being inspected, and then looking (e.g., by automatic, computer-implemented means) just for the relative handful of gamma-rays of the precise energies known and documented to constitute the Watermark, similarly to looking for a few trees of a known type located in a forest of similar but objectively nonidentical trees. (This "steganographic principle" of pseudo-randomly distributed concealment among many similar objects is also that which underlies the covertness and resistance to sweeping of the well-known Digital Watermark.)

In terms employed in modern communications technology, the Gamma Watermark's radiated intensity is very low, although its spectral brightness at certain very narrowly defined energies/frequencies is very high, when a high sensitivity, detector is appropriately positioned. It codes its continually transmitted spatially, narrow-casted message in a low amplitude/ambient noise obscured, spread-spectrum manner known only to its owner, simultaneously providing a low probability of intercept and a high link reliability. Its intrinsically long-lived, high reliability, nuclear power supply (comprised of single atoms of selected radioisotopes, packaged into an unstructured pellet of quasi-microscopic total size) supports its untended operation over multi-decade intervals.

Generally, the radionuclides chosen for use in the Gamma Watermark are either not present in the environment, or are present at very low levels. Some of these radionuclides are inexpensive and can be commercially purchased. If appropriate in any particular application, it is also possible to use more difficult-to-prepare radionuclides, such as those that would have unique production signatures connoting their site-of-generation. Many radionuclides of potential watermark utility (e.g., $^{44}$Ti) may be produced only by spallation or charged-particle bombardments. Others have unique isotopic purity by virtue of using mass-separated target material or mass-separation after production. These nuclides would be even more unique and difficult to obtain—and thus even more impractical to employs in a tag-counterfeiting operation.

Several distinct techniques may be used in creating very small or even microscopic tags. One technique which can be applied using inexpensive laboratory materials, is highly adaptable and which supports easy emplacement in the field is that of the "Gamma Watermark"-ed bead. In this approach, the radionuclides comprising the watermark are absorbed onto commercially available spherical cation-type ion-exchange beads. To do this, pre-sized beads are mixed with the "cocktail" of radionuclides dissolved in either water or dilute mineral acid. The liquid is removed and the beads are dried. Beads can either be pre-sized or not. If the beads are not pre-sized, then a wider variation of radionuclide concentration per bead must be tolerated. As many as thousands of "watermarked" beads thereby may be produced at one time, even in a small test tube. The beads are then individually packaged and assayed to determine precisely and document their radioactive content or "inventory". Readily-available ion-exchange bead sizes may vary from the nearly invisible (<50 micrometers diameter) to much larger (>1000) micrometers diameter), depending on the application of the tag. In the case of difficult field and/or emplacement conditions, the tag can be made in the form of the larger beads. A simple head-mounted magnifier, a hand-held or visor-light, and fine-tipped forceps and other tools are adequate to handle the bead variety of the "Gamma Watermark" in the laboratory or the field. This is the "multiple radionuclides on a single bead" methodology.

Another way to produce gamma watermark tags with ion-exchange beads is to use only one type of radionuclide per bead. This permits the tag's composition to be determined at the time of the tag's emplacement. For example, two or more no beads containing different individual radionuclides could be loaded in the same emplacement. If a different ratio of activities is desired, more than one bead of the same radionuclide could be used in the "grouping", or a bead of a higher level of any given radionuclide could be used. The beads may be emplaced in a suitable adhesive in order to fix their position and protect them. (The ideal depth of emplacement of such gamma watermark tags is two or more mm, in order to pre-absorb emitted beta particles. Thin-window counter detectors that detect low level beta particles are not common, but it is possible that a knowledgeable person with enough time might be able to detect a radioactive tag placed very close to the surface of the tagged object, if the betas were not pre-absorbed by the object material itself.)

For field applications, the ion-exchange beads comprising the tag may be placed in a crevice or a pit for irregular objects, in a hole drilled with a battery-operated tool (e.g., a hand-held power tool with a fine bit, or for more fragile and difficult objects, a portable dentist's drill). If broken pieces of human artifacts or paleontological specimens are glued together in the field or laboratory (which is a standard professional practice), the tags may be emplaced within a glue joint. In most emplacement circumstances, a digital photo with fiducial marks typically would be made to document the tag location(s) at the time of emplacement, both to aid in subsequent tag location and for evidentiary purposes.

The foregoing description of the invention has been presented for purposes of illustration and description and is not intended to be exhaustive or to limit the invention to the precise form disclosed. Many modifications and variations are possible in light of the above teaching. The embodiments were chosen and described to best explain the principles of the invention and its practical application to thereby enable others skilled in the art to best use the invention in various embodiments and with various modifications suited to the particular use contemplated. The scope of the invention is to be defined by the following claims.

We claim:

1. A method for tagging an object with a tag, wherein said method comprises affixing at least two radioisotopes to said object, wherein the quantity of each radioisotope of said at least two radioisotopes is controlled to produce a controlled ratio of quantities of each radioisotope relative to the other radioisotopes of said at least two radioisotopes, wherein said controlled ratio encodes digital information within said tag which numeric content can be recovered over time-intervals by use of appropriate detection apparatus, wherein said step of affixing at least two radioisotopes to said object comprises metering said radioisotopes out from at least one solution-containing reservoir of an inkjet printing mechanism operating under algorithmic control to tag said object with a tag in real time.

2. The method of claim 1, wherein at least one radioisotope of said at least two radioisotopes comprising said tag are employed to encode the time-since-creation of said tag.

3. The method of claim 1, wherein said tag is employed for purposes of object identification.

4. The method of claim 1, wherein said quantity of each radioisotope of said at least two radioisotopes does not exceed 1 microCurie of decay activity at the time of creation of said tag.

5. The method of claim 1, wherein said tag comprises a digital bit-string representation encoded with some redundancy.

6. The method of claim 1, wherein at least one radioisotope of said at least two radioisotopes comprises a radionuclide in a specified amount to encode the numerical content of a binary bit-string whose length is at least one bit.

7. The method of claim 1, wherein said object comprises a material object of essentially greater than microscopic scale.

8. The method of claim 5, wherein said redundancy comprises a Hamming error-syndrome built into said tag.

9. The method of claim 1, wherein at least one radioisotope of said at least two radioisotopes comprises radionuclides which are carried on at least one bead of an ion-exchange or zeolite variety.

10. The method of claim 1, wherein at least one radioisotope of said at least two radioisotopes comprises radionuclides which are metered out from at least one solution-containing reservoir of an inkjet-type printing mechanism operating under algorithmic control.

11. The method of claim 1, further comprising, controlling detection of said tag and numeric content read-out processes with a digital computer-implemented algorithmic means.

12. A method for tagging any object with a tag, wherein said method comprises tagging said object with at least two radioisotopes deposited in a pattern that is to be determined with an appropriate detector-and-collimator arrangement, wherein each radioisotope of said at least two radioisotopes comprises a specified quantity of radionuclides relative to each of the other radionuclides of said at least two radioisotopes to produce a relative mixture of radionuclides, wherein numeric information is encoded in said relative mixture of radionuclides, wherein each radioisotope is metered on said object or upon a tag to be affixed to said object from an ink-jet printer in real time.

13. The method of claim 12, wherein each radioisotope is metered on said object or upon a tag to be affixed to said object using ink-jet printer technology.

14. The method of claim 12, wherein each radioisotope is delivered to said object with the ink typically resident in an ink-jet cartridge of said ink-jet technology, resulting in a watermark visible to said detector-and-collimator arrangement.

15. The method of claim 13, wherein each said radioisotope is delivered from an ink-jet printer cartridge to produce low level radioactive tags incorporated invisibly onto previously existing objects.

16. The method of claim 12, wherein said radionuclides emit penetrating high-energy gamma rays.

17. The method of claim 12, further comprising determining the approximate date at which an object was tagged by measuring the decay of at least one radioisotope of said at least two radioisotope, wherein said at least one radioisotope comprises a precisely known quantity of deposited radionuclide with an appropriate half life.

18. The method of claim 12, further comprising creating two dimensional signature logos detectable as low energy gamma-ray watermarks.

19. The method of claim 18, further comprising identifying said two dimensional signature logos with a modern strip gamma-ray detector.

20. The method of claim 18, further comprising identifying said two-dimensional signature logos with Compton gamma-ray imaging detectors.

21. A method for tagging any object with a tag, wherein said method comprises tagging said object with at least two radioisotopes deposited in a pattern that can be determined with an appropriate detector-and-collimator arrangement, wherein each radioisotope of said at least two radioisotopes comprises a specified quantity of radionuclides relative to each of the other radionuclides of said at least two radioisotopes to produce a relative mixture of radionuclides, wherein numeric information is encoded in said relative mixture of radionuclides, further comprising creating and identifying three-dimensional logo patterns using the gamma-ray tomography.

22. A method for identifying an object, wherein said method comprises directing, a high-energy radioactive ion beam at said object, wherein said ion beam comprises an energy distribution, wherein said energy distribution is used to record a unique signature upon or within said object.

23. The method of claim 22, wherein said object includes an ion implantation depth on said ion beam, wherein said high-energy radioactive ion beam comprises a characteristic beam energy/direction, wherein said characteristic beam energy/direction versus said ion implantation depth of said object provides a unique three-dimensional signature upon or within said object.

24. The method of claim 12, wherein information about said object is encoded in a spatial distribution of each radionuclide relative to the other radionuclides of said at least two radioisotopes.

25. The method of claim 24, wherein said pattern comprises a bar-code.

26. The method of claim 9, further comprising incorporating low-level radioactive tags into label.

27. The method of claim 26, further comprising affixing said label to said object.

28. The method of claim 27, wherein said object comprises something which is often counterfeited.

29. The method of claim 1, wherein said object comprises currency.

30. The method of claim 1, wherein said object comprises media bearing computer software.

31. The method of claim 9, wherein said previously existing objects comprise works of art.

32. The method of claim 15, wherein said previously existing objects comprise documents.

33. The method of claim 16, further comprising determining the presence of a tagged document in a set of documents by detecting said penetrating high-energy gamma rays.

34. The method of claim 17, wherein at least one radionuclide of said at least two radioisotopes is distributed throughout said tag.

35. The method of claim 17, wherein at least one radionuclide of said at least two radioisotopes is placed in a limited area or volume of said tag.

36. The method of claim 35, wherein said limited area comprises one line of a bar code.

37. The method of claim 36, wherein said bar code is invisible to the unaided eye.

38. The method of claim 2, wherein at least two radioisotopes are employed to encode said time-of-creation of said tag, wherein the ratio of the intensities of two gamma-ray-emitting transitions of two radioisotopes of different half-lives is made to be equal to unity in said watermark, as a time-originating convention, wherein at any later time, the then-observed ratio of line intensities of said transitions constitutes a 'clock' whose 'elapsed time-reading' may be determined as precisely as desired, simply by choosing how long to inspect the clock.

39. The method of claim 2, wherein said time-of-creation of said tag is initiated by placing a fixed, reference amount of a single clock radionuclide in said tag, wherein the age of said tag is determined by the fraction of the reference amount which remains.

40. The method of claim 2, wherein said tag comprises a signature, wherein the content of said signature comprises a sequence of bits in a binary bit-string of dozens of bits in total length, and is encoded by fixing the ratio of the line-intensity of the gamma-radiation from a radioisotope to reference line-intensity, translated back to the time of creation of said tag by use of the time interval encoded in said clock.

41. The method of claim 40, wherein said signature comprises at least two code blocks, wherein the ordering of said code blocks is that bit-string decoded from the lowest-spectral-energy gamma-ray line being sequentially followed by the other code blocks in the order of increasing gamma-ray spectral-energy, one block per gamma-ray line, up to the code block corresponding to the highest spectral-energy gamma-ray line.

42. A gamma watermark, comprising:

a tag comprising at least two radioisotopes, wherein the quantity of each radioisotope of said at least two radioisotopes is controlled to produce a controlled ratio of quantities of each radioisotope relative to the other radioisotopes of said at least two radioisotopes, wherein said controlled ratio encodes digital information within said tag which numeric content that can be recovered over time-intervals by use of appropriate detection apparatus, wherein at least one radioisotope of said at least two radioisotopes comprises radionuclides which are metered out in real time from at least one solution-containing reservoir of an inkjet printing mechanism operated under algorithmic control.

43. The gamma watermark of claim 42, wherein at least one radioisotope of said at least two radioisotopes comprising said tag encode the time-since-creation of said tag.

44. The gamma watermark of claim 42, wherein said tag is affixed to an object for purposes of identification of said object.

45. The gamma watermark of claim 42, wherein said quantity of each radioisotope of said at least two radioisotopes does not exceed 1 microCurie of decay activity at the time of creation of said tag.

46. The gamma watermark of claim 42, wherein said tag comprises a digital bit-string representation encoded with some redundancy.

47. The gamma watermark of claim 43, wherein at least one radioisotope of said at least two radioisotopes comprises a radionuclide in a specified amount to encoded the numerical content of binary bit-string whose length is at least one bit.

48. The gamma watermark of claim 42, wherein said object comprises a material object of essentially greater than microscopic scale.

49. The method of claim 46, wherein said redundancy comprises a Hamming error-syndrome built into said tag.

50. The gamma watermark of claim 42, wherein at least one radioisotope of said at least two radioisotopes comprises radionuclides which are carried on at least one bead selected from a group consisting of an ion-exchange bead and a zeolite bead.

51. The gamma watermark of claim 42, wherein said radionuclides emit penetrating high-energy gamma rays.

52. The gamma watermark of claim 50, wherein said at least one radioisotope comprises a precisely known quantity of deposited radionuclide with in appropriate half life, wherein the appropriate date of emplacing said tag on an object is determinable by measuring the decay of at least one radioisotope of said at least two radioisotopes.

53. The gamma watermark of claim 42, wherein said at least two radioisotopes encode the time-of-creation of said tag and comprises different half-lives, wherein the ratio of the intensities of two gamma-ray-emitting transitions of said at least two radioisotopes is made to be equal to unity to in said tag, as a time-originating convention, wherein at any later time, the then-observed ratio of line intensities of said transitions constitutes a 'clock' whose 'elapsed time-reading' may be determined as precisely as desired, simply by choosing how long to inspect the block.

54. The gamma watermark of claim 42, wherein said tag is encoded with information including the time-of-creation of said tag, wherein said time-of-creation of said tag comprises a fixed, reference amount of a single clock radionuclide in said tag, wherein the age of said tag is determined by the fraction of the reference amount which remains.

55. The gamma watermark of claim 42, wherein said tag comprises a signature, wherein the content of said signature comprises a sequence of bits in a binary bit-string of dozens of bits in total length, and is encoded by fixing the ratio of the line-intensity of the gamma-radiation from a radioisotope to a reference line-intensity, translated back to the time of creation of said tag by use of a time interval encoded in said clock.

56. The gamma watermark of claim 55, wherein said signature comprises at least two code blocks, wherein the ordering of said code blocks is that bit-string decoded from the lowest-spectral-energy gamma-ray line being sequentially followed by the other code blocks in the order of increasing gamma-ray spectral-energy, one block per gamma-ray line, up to the code block corresponding to the highest spectral-energy gamma-ray line.

57. The method of claim 14, further comprising incorporating low-level radioactive tags into a label.

58. The method of claim 15, wherein said previously existing object comprise works of art.

* * * * *